Oct. 16, 1951  R. B. NELSON  2,571,156
ULTRA-HIGH FREQUENCY FIELD RESPONSIVE APPARATUS
Filed Aug. 12, 1949
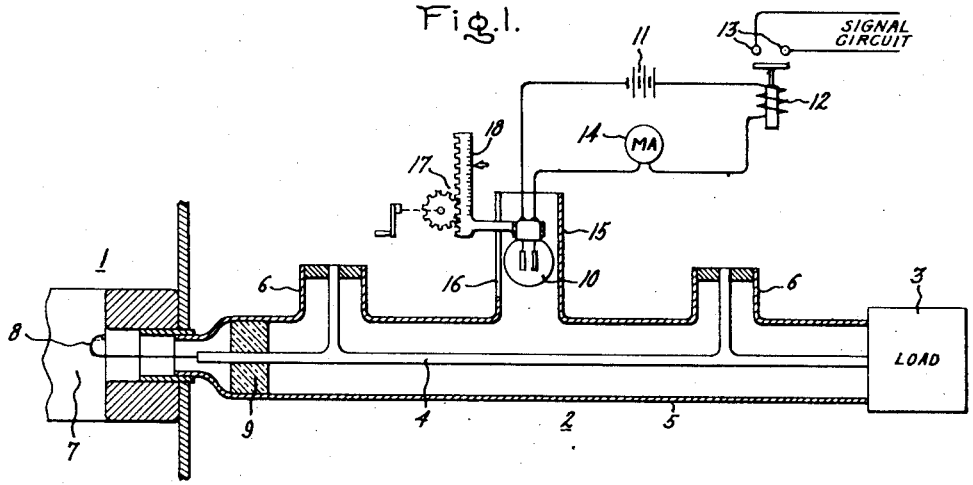
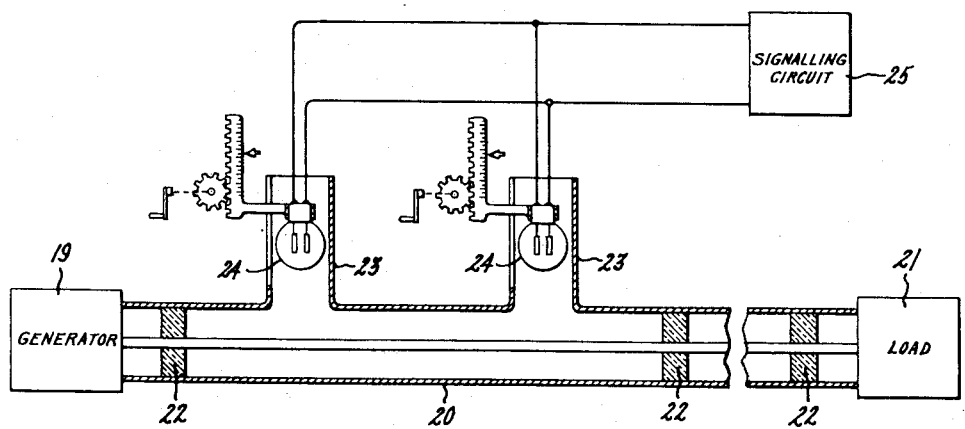
Inventor:
Richard B. Nelson,
by Richard E. Hosley
His Attorney.

Patented Oct. 16, 1951

2,571,156

UNITED STATES PATENT OFFICE 2,571,156

ULTRA HIGH FREQUENCY FIELD RESPONSIVE APPARATUS

Richard B. Nelson, Schenectady, N. Y., assignor to General Electric Company, a corporation of New York Application July 12, 1949, Serial No. 104,355

4 Claims. (Cl. 177—311)

My invention relates to apparatus responsive to the electromagnetic field intensity in ultra-high frequency systems.

In using transmission lines of either the concentric conductor or hollow wave guide types to conduct ultra-high frequency energy from a generator to a load, it is usually necessary to prevent high standing waves in the lines. The high electromagnetic field intensities associated with the high standing waves may result in breakdown of the line or the dielectric output seal of an electron discharge device employed as a power generator. When a magnetron generator is used in the system, excessive cathode back-heating caused by high standing waves in the line may also result in failure. To protect such a system, signalling apparatus responsive to the presence of high standing waves and which will indicate or rectify the condition are necessary. Devices for detecting and limiting the standing wave ratio have commonly been employed for protecting the system apparatus; however, such apparatus is not adequate since it is actually an excessive field intensity which causes breakdown, whereas a very high standing wave ratio may be tolerated at low power levels.

It is an object of my invention to provide an improved signalling apparatus responsive to the field intensity in a hollow conductor.

It is a further object of my invention to provide a protective apparatus for operating a current responsive signalling means when a predetermined electromagnetic field intensity is realized in an utra-high frequency transmission line.

In my invention, I employ a gaseous discharge device comprising a pair of electrodes in a gaseous atmosphere, which device is positioned so that an excessive field intensity in the transmission line to be protected ionizes the gaseous atmosphere of the discharge device. An external source of voltage is connected across the electrodes of the discharge device and causes a current to flow between them when the gaseous atmosphere between them has been ionized. Signalling means responsive to this current are employed to indicate the field level or to shut off the generator. To adjust the field level at which current flows, the discharge device is adjustably positioned in a hollow pipe attenuator connected to the outer conductor of the transmission line, the attenuator consisting of a wave guide section of a size below cut-off for the frequencies propagated in the transmission line so that the field intensity within that section decreases with distance from the transmission line. Since the gas discharge is initiated by a certain definite high frequency field strength, the position of the discharge device at which it just breaks down is a measure of the field in the transmission line.

By positioning the attenuator and discharge device at a known weak point in the transmission line or at a distance equivalent to an integral number of one-half wave lengths at the frequency transmitted, suitable protection from high standing wave maxima may be obtained. For more fully protecting the transmission line, two discharge devices of the nature described may be connected in parallel and spaced apart a distance equivalent to one-fourth wave lengths or an odd multiple thereof. With such an arrangement, one of the discharge devices will always be at a position where the standing wave is at least .707 times its maximum value.

For a better understanding of my invention, reference may be had to the following description taken in connection with the accompanying drawing, and its scope will be pointed out in the appended claims. In the drawing, Fig. 1 illustrates an embodiment of my invention as used in a transmission line to protect a dielectric seal of a discharge device generator, and Fig. 2 represents an embodiment employing a plurality of gaseous discharge devices.

Referring now to Fig. 1, an ultra-high frequency system comprising an ultra-high frequency generator, shown in part at Fig. 1, a transmission line 2, and a load 3 is shown. The transmission line 2 is illustrated as the concentric type having an inner conductor 4 and a concentric outer conductor 5, both made of a suitable conductor such as copper or brass. Conventional means for supporting the inner conductor 4 are employed, such as the short circuited stub supports 6 which have an equivalent length of one-quarter of wave length at the frequency of the transmission line energy and function in a manner well known in the art.

The generator 1 may be of the magnetron type, for example, having a space resonant cavity 7 from which output energy is derived in the usual manner by a coupling loop 8 which is connected to the inner conductor 4 of the transmission line. The vacuum tightness of the magnetron generator is maintained by a glass bead 9 which forms a seal between the inner and outer transmission line conductors 4 and 5 at a point near the coupling loop 8. Other suitable output dielectric seals may, of course, be employed. Since the dielectric employed is subject to heating and electrical failure if the electromagnetic field intensity at the output seal is too high, high standing wave maxima at the seal 9 should be avoided. Similarly, cathode back-heating in the magnetron due to undesirably high standing wave ratios should also be prevented. The excessively high field intensity is associated with high standing wave maxima usually caused by failure to correctly match the load 3 to the transmission line 2 or by other sources of wave reflections in the system.

According to my invention, I employ a gaseous discharge device 10 having a pair of electrodes in a gaseous atmosphere and enclosed in an envelope of glass or other suitable dielectric material as a means for detecting a high intensity electromagnetic field. A stable source of voltage 11, preferably a battery, is connected to the electrodes of the discharge device 10 so that current may flow in the external discharge device circuit when the gaseous atmosphere between the device electrodes is ionized and rendered conductive by the electromagnetic field of the transmission line 2. In series with the voltage source 11 is a current responsive signalling means 12, such as the coil of a relay, having circuit interrupting contacts 13 which may be employed to shut down the generator 1 or otherwise furnish a signal when the relay coil 12 is energized. A milliammeter 14 or other suitable indicating instrument may also be employed in series with a voltage source 11 to provide a visual indication of current flow in the discharge device circuit. I have found a one-fourth watt neon glow lamp of the type generally commercially available to be satisfactory as the discharge device 10 after the ballast resistance is removed from the lamp. This type of lamp, after it has been fired a few times, has a sufficiently definite breakdown characteristic so that it may be used in apparatus calibrated as described in a following paragraph.

To adjust the field level at which the discharge device 10 will be ionized and thus trigger its external circuit, the device 10 is adjustably positioned in an attenuator 15 connected to transmission line 2. The attenuator 15 is a length of hollow conducting pipe or tubing which comprises a section of wave guide with cross section dimensions sufficiently small so as not to propagate waves of the frequency in the transmission line 2. The attenuator is preferably soldered to the outer conductor 5 of the transmission line, the conductor 5 being suitably cut away in order that a portion of the field in the transmission line may extend into the attenuator. Hence, the field within the attenuator section 15 decreases with distance from the transmission line and the position of the discharge device within the attenuator may be selected according to the maximum field intensity which is to be tolerated. Adjustable means for positioning the discharge device along the attenuator are provided, a gear and rack drive 17 being preferably employed, and the attenuator is suitably slotted at 16 to accommodate the adjusting means.

A scale 18 on the discharge device positioning means 17 is calibrated in terms corresponding to the electromagnetic field intensity required to render the discharge device conductive at the corresponding position. This is initially accomplished by carefully matching the transmission line 2 to a determinable load, such as a water load. The load power required to render the discharge device 10 conductive at various positions within the attenuator 15 is observed and the scale 18 is accordingly marked. The voltage of the source 11 may be adjusted so that a greater or lesser field strentgh is required to trigger the discharge device. However, this external voltage should always be below a value which would render the discharge device conductive with no ultra-high frequency field acting on the gaseous atmosphere within the device envelope.

In operation, the discharge device 10 and attenuator 15 may be located at a point along the transmission line where the standing wave maximum occurs. If certain weak points in the system are to be protected, the protective apparatus is located so as to be responsive to the standing wave value appearing at the point to be protected. Accordingly, when a weak point in the system is known, such as the dielectric generator output seal 9, the attenuator is preferably located a distance from the seal equivalent to one-half the wave length at the frequency of the energy in the transmission line or to any integral multiple of that distance. With the discharge device so located, it is subject to ionization by an electromagnetic field at the same level of intensity as at the point to be protected.

In the embodiment shown in Fig. 2, a pair of discharge devices are connected in parallel so that high field levels can be detected even though the standing wave location is not determined. Accordingly, in an ultra-high frequency system comprising a generator 19, a concentric transmission line 20, and a load 21, standing waves caused by a mismatch of the load impedance or by any other condition, cause standing wave maxima at certain points along the transmission line.

Insulating spacers 22 of a suitable dielectric may be employed in a conventional manner to space the inner and outer conductors of the transmission line 20 at a number of points along the line and are susceptible to failure because of excessive field intensities. As in the system illustrated in Fig. 1, a generator output seal (not shown) may also require protection from high intensity fields. Two hollow pipe attenuators 23 are connected to the line and are spaced from each other a distance along the transmission line equal to one-fourth the wave length or any odd multiple thereof at the frequency of the transmission line energy. Positioned in each of the attenuators 23 is a gaseous discharge device 24 of the type previously heretofore described, the discharge device 24 being connected in parallel to a circuit 25 containing a source of voltage and a current responsive signalling means. Each attenuator and associated discharge device circuit is calibrated with a standard known load on the transmission line that the location of the discharge device in the attenuator can be correlated with the level of the electromagnetic field in the adjoining portion of the wave guide. In this embodiment, even though the standing wave location is not exactly known, as is quite likely in view of the various conditions causing wave reflections in a transmission line, one of the discharge devices will always be positioned where the standing wave voltage is at least .707 times its maximum value. Of course, it is obvious that, without departing from the spirit of my invention, additional auxiliary attenuators and discharge device circuits may be employed for determining a maximum or near maximum value of the field intensity.

It is to be understood that in the foregoing description I have not limited the application of my protective apparatus to transmission lines of the concentric conductor type, and that my invention may be employed in connection with hollow conductors for ultra-high frequency energy, such as are generally known as wave guides.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. Apparatus responsive to the electromagnetic field strength of ultra-high frequency energy in a hollow conductor comprising a hollow metallic attenuator connected to said conductor, said attenuator comprising a section of wave guide with cross section dimensions sufficiently small to cut off propagation of waves at the frequency of said energy, a gaseous discharge device positioned in said attenuator, said discharge device comprising a pair of electrodes in a gaseous atmosphere subject to ionization by said energy, and means connected to said electrodes responsive to the ionized condition of said gaseous atmosphere.

2. Apparatus responsive to the electromagnetic field strength of ultra-high frequency energy in a hollow conductor which comprises a hollow metallic attenuator connected to said conductor, said attenuator being a section of wave guide with cross section dimensions so small as to cut off propagation of waves at the frequency of said energy, a gaseous discharge device comprising a pair of electrodes in a gaseous atmosphere subject to ionization by said energy, means for adjustably positioning said discharge device in said attenuator, a source of voltage connected to said discharge device, and current responsive signalling means in series with said source.

3. Apparatus responsive to the electromagnetic field intensity of ultra-high frequency energy in a concentric conductor transmission line which comprises a hollow metallic attenuator connected to the outer conductor of said transmission line, said attenuator being a section of wave guide with cross section dimensions so small as to cut off propagation of waves at the frequency of said energy, a gaseous discharge device comprising a pair of electrodes in a gaseous atmosphere subject to ionization by said energy, said discharge device being positioned within said attenuator, calibrated means for positioning said device along the length of said attenuator, a source of voltage connected to said electrodes, said voltage being insufficient by itself to ionize said gaseous atmosphere between said electrodes and signalling means in series with said voltage source responsive to current flow in said circuit when said gaseous atmosphere is ionized.

4. Apparatus responsive to the electromagnetic field intensity of ultra-high frequency energy in a transmission line having an outer hollow conductor which comprises a plurality of hollow metallic attenuators connected to said conductor, each of said attenuators comprising a section of wave guide with cross section dimensions so small as to cut off wave propagation at the frequency of said energy, said attenuators being spaced from each other a distance along the transmission line equivalent to one-fourth wave length at the frequency of said energy, a gaseous discharge device adjustably positioned in each of said attenuators, each of said devices comprising a pair of electrodes in a gaseous atmosphere subject to ionization by said energy, said devices being connected in parallel and to a source of voltage, and signalling means in series with said voltage source responsive to current flow when said gaseous atmosphere of either of said discharge devices is ionized.

RICHARD B. NELSON.

REFERENCES CITED

The following references are of record in the file of this patent:

UNITED STATES PATENTS

| Number | Name | Date |
|---|---|---|
| 2,106,770 | Southworth et al. | Feb. 1, 1938 |
| 2,408,425 | Jenks et al. | Oct. 1, 1946 |
| 2,415,242 | Hershberger | Feb. 4, 1947 |
| 2,422,190 | Fiske | June 17, 1947 |